United States Patent [19]

Suzuki et al.

[11] 3,763,009

[45] Oct. 2, 1973

[54] SYNTHESIS PROCESS FOR THE PRODUCTION OF ASCORBIC ACID GLUCOSIDE

[75] Inventors: Yukio Suzuki, Kurashiki; Toshio Miyake, Okayama, both of Japan

[73] Assignee: Hayashibara Company, Okayama, Japan

[22] Filed: Oct. 4, 1971

[21] Appl. No.: 186,387

[30] Foreign Application Priority Data
Oct. 5, 1970 Japan.................................. 45/87419

[52] U.S. Cl................ 195/31 R, 99/11, 260/210 R, 424/280
[51] Int. Cl............................................... C12b 1/00
[58] Field of Search................... 195/28 R, 31 R, 62, 195/66, 68; 99/11; 260/210 R; 424/280

[56] References Cited
UNITED STATES PATENTS
3,669,835 6/1972 Suzuki.............................. 195/28 R
3,296,092 1/1967 Corman............................ 195/31 R
3,335,066 8/1967 Corman............................ 195/31 R

OTHER PUBLICATIONS

Chen, Chem. Abs. Vol. 58, No. 3274b, 1963.

*Primary Examiner*—A. Louis Monacell
*Assistant Examiner*—Gary M. Nath
*Attorney*—Alvin Browdy

[57] ABSTRACT

The present invention relates to a process for the improvement of the oxidation resistance of ascorbic acid by subjecting a mixture of ascorbic acid, maltose and/or oligosaccharides to the action of an enzyme derived from genera Asperigillus, Penicillium or others to convert the mixture enzymatically into ascorbic acid glucoside.

5 Claims, No Drawings

SYNTHESIS PROCESS FOR THE PRODUCTION OF ASCORBIC ACID GLUCOSIDE

The present invention relates to a process for the improvement to the oxidation resistance of ascorbic acid by subjecting a mixture of ascorbic acid, maltose and-/or oligosaccharides to the action of an enzyme derived from genera Aspergillus, penicillium or others to convert the mixture enzymatically into ascorbic acid glucoside.

The invention will be illustrated in detail. Ascorbic acid, also referred to as vitamin C, has been known as an antiscorbutic factor for many years and the product is used in large quantities in foods and feeds.

Ascorbic acid, however, owing to its unstability which is due to its chemical structure is oxidized under atmospheric conditions and readily loses its physiological activity, especially, in the presence of a slight amount of cupric ions oxidation by atmospheric air is further accelerated. Therefore the stabilization of the product against oxidation is of great importance in view of the practical utilization of vitamin C.

A report available at present relating to the stabilization of ascorbic acid has been published in Journal of the Agricultural Chemical Society of Japan, Vol. 20, 363, 1944. In the process reported, ascorbic acid is stablized with an addition of maltose. Attempts have been made to stabilize ascorbic acid by synthesizing saccharide derivatives of ascorbic acid. The attempts, however, have not proved successful so far.

The present inventors have succeeded in developing a synthesis process for the production of riboflavin glucoside and have carried their studies further with the object of developing an enzymatic process for the synthesis of ascorbic acid glucoside. Their investigations on the feasibilities of enzymes produced by genera Leuconostoc, Mucor, Phizopus, Penicillium ane Aspergillus confirmed the facts that the enzyme produced by genera Aspergillus, or Penicillium forms ascorbic acid glucoside most effectively. The enzymatic process, which the inventors succeeded in developing, will be illustrated further.

Culture, extracts of *Aspergillus niger, Aspergillus awamori, Aspergillus usamii, Aspergillus saitoi, Aspergillus kawachii, Aspergillus meleus, Penicillium chrysogenum,* or *Penicillium purpurogenum* were added as an enzyme source to a mixture of sodium L-ascorbate and maltose, whereupon the mixture was incubated. The paperchromatogram of the reaction mixture showed several new spots at positions of lower Rf values (0.41 and 0.23 of ascorbic acid Rf value), indicating the formations of ascorbic acid glucoside or oligosaccharide derivatives. Ascorbic acid and its derivatives were precipitated and separated in the form of basic lead salts from the resultant solution to remove excess saccharides. The derivative product thus obtained is conceived as a glucoside formed by the ether type linkages of the primary alcohol group of the sixth carbon of ascorbic acid. Therefore on hydrolyzing the product with sulphuric acid or with the enzyme solution of genera Aspergillus or penicillium a new spot appeared at the position of glucose on the paperchromatogram of the hydrolyzate. When the spot was further subjected to the action of glucose oxidase the spot migrated to a position which corresponds to that of gluconic acid. This derivative did not hydrolyze when subjected to the action of commercial crystalline maltase prepared from yeast; exhibiting a similar behavior to that of riboflavin glucoside. Therefore the obtained saccharide derivatives were established as glucoside and oligosaccharide-like substances which were formed by the transformation reaction of the enzyme of genera Aspergillus or Penicillium.

Ascorbic acid is most readily oxidized in air. Therefor the derivatives formed by the enzymatic transformation reaction were tested for their oxidation resistances in boiling water with the addition of cupric ions. From the results it was apparent that, even if most of the free ascorbic acid present in the ascorbic acid glucoside mixture was decomposed, over 50 percent of the glucoside remained in the product, which is an evidence of the extremely high stability of the product. Accordingly the inventors succeeded in inventing a stabilization process for L-ascorbic acid which is extremely unstable to oxidation by converting the acid into new saccharide derivatives utilizing a biochemical process.

The inventors screened various enzyme sources, such as *Aspergillus niger* IAM 2534, *Aspergillus awamori* IAM 2299, *Aspergillus usamii* IAM 2185, *Aspergillus saitoi* IAM 2196, *Aspergillus kawachii* IAM 2062, *Aspergillus meleus* IFO 4420, *Mucor japanicus* IFO 4570, *Leuconostoc mesenteroides* IAM 1151, *Phizopus javanicus* IFO 5452, *Phizopus orzae* IFO 4716, *Penicillium chrysogenum* IAM 7326, *Penicillium purpurogenum* IAM 7095, cabbage and others, in the attempt to discover enzymes capable of transforming saccharides. The result of their screening showed that the enzyme derived from genera Aspergillus or Penicillium is the most superior enzyme for the objective and that enzymes of genera Mucor, Leuconostoc, Phizopus or others do not effect formation of saccharide transformation products. Purified transferase extracted from cabbage was also tested, resulting in the findings that although the yield of the products is low, the enzyme effects formation derivatives of glucose and the analogs, which is evident by paperchromatography.

In the invention the enzyme is derived from genera Aspergillus or Penicillium by the following procedure. After cultivating the strains for about a week on a Czapek Dox agar culture medium, the strains are inoculated on a wheat bran culture medium placed in a 300 ml, Ehrlenmeyer flask and to which is added 10 grs wheat bran and 15 ml of a system of the following and which is sterilized by autoclave at 120°C for 20 minutes.

| | |
|---|---|
| $NH_4NO_3$ | 0.1 % |
| $NaNO_3$ | 0.1 % |
| Polypeptone | 0.2 % |
| $KH_2PO_4$ | 0.1 % |
| $MgSO_4 \cdot 7H_2O$ | 0.05 % |
| KCl | 0.05 % |

The mixture is then incubated statically at 30°C for three days. Subsequent to the incubation the culture is extracted with 100 ml of warm water at 30°C for three hours, salted out with ammonium sulphate at 0.5 – 0.75 saturation. After the salted out product is dissolved in water and dialyzed, to the resultant product is added a Rivanol solution and then allowed to stand overnight at 4°C. Thereafter by centrifugation the supernatant is separated, dialyzed against water, and then are added 10 mg percent calcium chloride and cold acetone at 0 – 55 percent v/v, and then the precipitates are collected by centrifugation and the precipitates are dissolved in a 0.01 M acetic acid buffer solution (pH 5.3). The supernatant thus obtained was used as the enzyme solution.

The saccharides which may be employed in the reaction according to the invention are starch hydrolyzates such as maltose and partially hydrolyzed starches. Since ascorbic acid and saccharides which are subjected to the reaction are water soluble, the amount of each which can be employed lies in the range of 5 – 30 percent. A double fold amount, by weight, in comparison with that of ascorbic acid is required in the case of maltose. Although an amount of oligosaccharides which exceeds the equivalent amount of ascorbic acid is required, in order to improve the yield of glucoside an employment of a double to triple fold amount, by weight, of the saccharides is preferable. However an excessive amount of saccharides causes, of course, difficulty in the subsequent remova of unreacted saccharides. In case a double fold amount, by weiglt, of saccharides compared to that of ascorbic acid is employed the yield of ascorbic acid glucoside or its oligosaccharide derivatives can be raised up to 50 – 70 percent.

Preferably, the reaction between saccharides and ascorbic acid in an acetic acid buffer solution (pH 5.0 – 6.0) should be carried out with a slight addition of thiourea in order to prevent oxidation of ascorbic acid. The reaction is carried out at a temperature lower than 55°C over a period of more than four hours.

The amount of enzyme to be employed in said reaction is 5000 units per gram ascorbic acid. In other words, the reaction with the use of 3000 – 6000 units of enzyme of genera Aspergillus or Penicillium per gram ascorbic acid is completed within a period of 5 – 10 hours.

Method for the Determination of Enzymatic Activity

The enzyme activity is indicated by the capacity of forming riboflavin-alpha-glucoside from a mixture of riboflavin and maltose: A reaction solution (10 ml) witl the following composition is incubated at 50°C for 30 mitutes in a dark room. The enzyme solution is diluted 100 folds, by weight, with

| | |
|---|---|
| a 0.1 M acetate buffer solution (pH 5.3) | 1 ml |
| 5 % maltose solution | 2 ml |
| 60 mg % riboflavin solution dissolved in a 0.1 M acetate buffer solution (pH 5.3) | 5 ml |
| pure water | 2 ml |

The enzyme is inactivated by immersing the mixture in a boiling water bath and then 2 ml of the reaction mixture is developed twice on a filter paper. The cut spot which corresponds with the riboflavin glucoside portion is extracted with 10 ml of water at 50°C for an hour. The extract is filtered and determined on optical density at 450 m$\mu$ and the $\mu$g of the produced riboflavin glucoside is calculated from the standard curve.

One unit of the enzyme is defined as the amount of enzyme required to produce 1 $\mu$g of riboflavin glucoside under the conditions specified above. Activity of the 100 fold diluted solution of enzyme was 85 units.

It is preferable to carry out the purification of the reaction solution at a temperature lower than 4°C. To the reaction solution is added a lead acetate solution and then adjusted with ammonium hydroxide to pH 9.0. Ascorbic acid glucoside is precipitated as a yellowish white lead complex. The precipitates are centrifuged and the precipitates obtained are washed with a lead acetate solution and suspended in water. Lead present in the suspension is precipitated with sulphuric acid as lead sulfate. By this procedure the unreacted saccharides are removed. The procedure is repeated and the purity of the product is confirmed by paperchromatography. Upon concentrating the resultant product under reduced pressure the glucoside is obtainable in the form of a thick syrup or crystalline powder. Although the product still contains some ascorbic acid the product is applicable for practical uses. In order to obtain sodium salts of the product, the crystallines are dissolved in water and thereafter passes through a layer of strongly cationic ion exchanger to remove metal ions and neutralized with an equivalent addition of sodium hydroxide. By cooling the resultant product obtained by concentration under reduced pressure a syrup is obtained which is prepared into crystalline powder by drying in vacuo. The product thus obtained is pure containing no metal ions but ascorbic acid glucoside and its oligosaccharide derivatives.

The invention will be illustrated furthuer by the following examples. All portions in the examples are by weight unless indicated otherwise.

EXAMPLE 1

Strains of *Aspergillus niger* IAM 2534, *Aspergillus awamori* IAM 2299, *Aspergillus usamii* IAM 2185, *Aspergillus saitoi* IAM 2196, *Aspergillus kawachii* IAM 2062, *Aspergillus melleus* IFO 4420, *Penicillium chrysogenum* IAM 7326, *Penicillium purpurogenum* IAM 7095 were inoculated on a wheat bran medium (10 grams of wheat bran to which is added a synthetic medium) following a one wekk cultivation on a Czapek Dox agar medium. The mixture was cultured statically at 30°C for three days, whereupon it was extracted at 30°C for three hours with 100 ml of water. The extracted solution was then salted out with a 0.5 – 0.75 saturated ammonium sulphate and dialyzed against water. The solution thus obtained was used as the enzyme solution in the example.

12.8 grs of crystalline maltose monohydrate (purity 99.0 percent, dry substance basis) was dissolved in 50 ml of 0.2 M acetic acid buffer solution (pH 5.3). After adding to the lixture 7.04 grs of sodium L-ascorbate (a special grade reagent produced by Nakarai Kagaku K.K., Kyoto, Japan), 200 mg of thiourea and 4 ml of crude enzyme solution of *Aspergillus niger* IAM 2534, *Aspergillus awamori* IAM 2299, *Aspergillus usamii* IAM 2185, *Aspergillus saitoi* IAM 2196, *Aspergillus kawachii* IAM 2062, *Aspergillus meleus* IFO 4420, *Penicillium chrysogenum* IAM 7326, *Penicillium purpurogenum* IAM 7095 (the capacity of forming riboflavinyl glucoside, 34,000 units), the resultant was diluted in 100 ml of water and then incubated at 50°C for four hours. The enzyme was inactivated by immersing the resultant in a boiling water bath for five hours.

The saccharide removal procedure was carried out at 4°C, 20 grs of lead acetate was added to 90 ml of the reaction solution and the pH of the mixture was adjusted to 9.0 with an addition of an aqueous ammonia solution. The yellowish white precipitates of lead complex thus formed were centrifuged. The precipitates were washed twice with an aqueous ammonium hydroxide containing 1 percent of lead acetate (pH 8.0), suspended in a small amount of water and thereafter the mixture was adjusted to pH 3.0 by adding gradually to the mixture a 20 percent sulphuric acid. The reaction mixture was then purified by centrifuge to remove the sulphate present in the mixture. The above procedure was repeated three times and the complete removal of saccharides was detected by paperchromatography.

This reaction mixture was passed through a layer of Amberlite IR 200 (an ion exchanger produced by Rohm & Haas, New York, U.S.A.) to remove completely the metal ions present. The syrup was obtained by concentrating under reduced pressure the resultant acidic solution which was allowed to stand overnight, and then the precipitates formed were isolated and dried. A portion of the solution obtained by purification with the ion exchanger was concentrated under reduced pressure following neutralization with soxium hydroxide. A product was obtained by separating the thus formed crystals from the mother liquor. The composition of the product by enzyme of genus Aspergillus was about 51 percent ascorbic acid glucoside, about 23 percent ascorbic acid isomaltoside and the remainder ascorbic acid. The composition of the product by genus Penicillium was about 46 percent, 19 percent respectively.

The isolated ascorbic acid derivatives were dissolved in water and to 5 ml of the mixture was added 1 ml of 6N $H_2SO_4$ and then hydrolyzed by keeping the mixture in a boiling water bath for 0 – 120 minutes. The resultant was then neutralized with an addition of 400 mg $CaCO_3$, filtered to remove calcium salts, and then developed by paperchromatography with two types of developers. In each case the product was identified as glucoside from the exhibitions of spots which correspond with those of glucose.

Alternatively, an incubation using the enzyme of *Aspergillus niger* IAM 2534 was carried out in 0.4 ml of 1 M acetic acid buffer solution (pH 5.3) and the incubation was suspended by heating at 50°C for 30 minutes. From paperchromatography spots of new glucose subjected to hydrolysis were identified. Further, the spot of glucose cut from the paperchromatogram was extracted with water, concentrated under reduced pressure and the formation of glucose was confirmed by the glucose-oxidase-oxidation method. The progress of the oxidation reaction was determined by paperchromatography resulting in the observation that with the progress of the reaction glucose disappeared whereas a formation of gluconic acid was observed. Therefore the ascorbic acie derivative was confirmed as glucoside. The solution obtained by the above method was assayed for oxidation resistance with an addition of cupric ions.

To the purified derivative solution obtained by the above reaction was added 0.2 ml of 1 M acetate buffer (pH 4.0), 0.2 ml of a solution containing 40 μg of $CuSO_4 \cdot 5H_2O$, and 0.6 ml of water, and then kept in a boiling water bath (97°C) for 0 – 120 minutes. Aliquots of 0.05 ml each were collected from the reaction solution, which were thereafter developed on sheets of filter paper with a solvent system (BuOH : AcOH : $H_2O$ = 4 : 1 : 5). After drying the filter paper the substances present in the paper were developed by the silver nitrate-dip-method and then the residual ascorbic acid and its saccharide derivatives were determined with a densitometer (a product of Fuji Riken Co., Ltd., Tokyo, Japan). The result are given in the following table.

| Hours of treatment (min.) | 0 | 10 | 30 | 60 | 120 |
|---|---|---|---|---|---|
| Residual ascorbic acid, % | 100 | 76.4 | 36.4 | 6.4 | 3.6 |
| Residual ascorbic acid glucoside, % | 100 | 91.0 | 81.5 | 65.5 | 53.1 |

As apparent from the results shown in the table the glucoside, which is a new compound, was found stable.

EXAMPLE 2

An admixture of 10 grs of sodium L-ascorbate and 25 grs of corn syrup (dextrose equivalent 35 percent by weight was dissolved in 20 ml of water. The solution was brought to 0.1 M with an addition of an acetate buffer solution, then incubated at 50°C for five hours. Subsequent of the reaction, similarly as in Example 1, the ascorbic acid derivative was separated as a lead complex, the saccharides were removed and the lead was removed with the employment of sulphuric acid. Thereafter the resultant was deionized with strongly acidic ion exchangers, and neutralized with sodium hydroxide. A product in powder form was obtained by concentration under reduced pressure.

EXAMPLE 3

Process Employing a Transferase of Cabbage

The cabbage enzyme used in the present example was prepared according to the following procedure. 8 litres of 0.04 M acetate buffer solution (pH 5.3) were added to 10 kg of fresh cabbage. The mixture was crushed with a mixer and the enzyme which was present in the cabbage was extracted by centrifuge. To the residue thus obtained was added two litres of the same buffer solution wherein it was immersed at 25°C for an hour and centrifuged. Then both extracted solutions were put together which amounted to 16 litres. The extracted solution was then saturated with ammonium sulfate to 0.6 (3906 grs/litre) and allowed to stand at 4°C overnight and filtered. The precipitate obtained by filtration was suspended in 300 ml of a 0.05 M acetate buffer solution (pH 5.3) and 245 ml of supernatant was obtained after centrifuging. The residue was extracted with 100 ml of the same buffer solution and centrifuged, thus 345 ml of enzyme solution including the first supernatant was obtained. The solution was dialyzed at 4°C overnight against a 0.01 M acetic acid buffer solution (pH 5.3) in which 0.05 percent of calcium acetate was dissolved. The precipitate obtained by salting out the dialyzed solution with ammonium sulphate solution was extracted twice similarly as described above and the extraction solution thus obtained (143 ml) was used as enzyme solution in the present example.

To 9 ml of said enzyme solution were added 10 mg of thiourea, 350 mg of sodium L-ascorbate, 640 mg of maltose, and 1 ml of a 1 M acetate buffer solution (pH 5.3). The mixture was allowed stand at 37°C for 24 hours, whereupon a derivative of the acid formed. With 72 hours of reaction 20 percent of the derivative converted into glucoside.

The product was purified similarly as in Example 1 and a lead complex was obtained and decomposed with sulphuric acid. With strongly cationic exchangers, the glucoside was purified and concentrated to syrup or powder products.

What we claim is:

1. A process for the production of ascorbic glucoside or ascorbic acid oligosaccharides, comprising adding a saccharide to an aqueous solution of L-ascorbic acid or its salt, subjecting the mixture to the action of fungal transglucosidase derived from microorganisms of genera Aspergillus or Penicillium or botanical transglucosidase derived from cabbage, thus forming ascorbic acid glucoside or ascorbic acid oligosaccharides, and then purifying and concentrating the resultant to obtain the ascorbic acid glucoside or ascorbic acid oligosaccharide derivatives.

2. A process according to claim 1, wherein, in said subjecting step, the mixture is subjected to the action of an enzyme producing strain selected from the group consisting of *Aspergillus awamori* IAM 2299, *Aspergillus usamii* IAM 2185, *Aspergillus saitoi* IAM 2196, *Aspergillus Kawachii* IAM 2062, *Aspergillus meleus* IFO 4420, *Penicillium chrysogenum* IAM 7326, and *Penicillium purpurogenum* IAM 7095.

3. A process according to claim 1, wherein the saccharide to be added is maltose or a partial hydrolyzate of starch.

4. A process according to claim 1, wherein the enzymatic reaction is carried out with an addition of thiourea as a stabilizer.

5. Ascorbic acid glucoside and/or ascorbic acid oligosaccharide derivatives produced by the process of claim 1.

* * * * *